United States Patent

[11] 3,570,619

[72] Inventor Ronald Taylor
Eskdale Mills, Langholm, Dumfriesshire, England
[21] Appl. No. 755,107
[22] Filed Aug. 26, 1968
[45] Patented Mar. 16, 1971
[32] Priority Aug. 26, 1967
[33] Great Britain
[31] 39,341/67

[54] WHEEL ASSEMBLIES FOR JIB CRANES OR EXCAVATORS
5 Claims, 5 Drawing Figs.
[52] U.S. Cl. .................................................. 180/22, 180/26, 180/27, 280/43.23, 280/62, 280/80
[51] Int. Cl. .................................................... B62d 61/10
[50] Field of Search .......................................... 180/21, 22, 25, 26, 26 (A), 27

[56] References Cited
UNITED STATES PATENTS
1,716,732   6/1929   Mossay ........................ 180/27X

*Primary Examiner*—A. Harry Levy
*Attorney*—Young and Thompson

ABSTRACT: A chassis and wheel assembly for use with a crane, the assembly having at least a front wheel and a pair of rear wheels. In one position of the wheels, the crane is set for longitudinal travel, and in a second position the crane can slew. The spacing between the rear wheels which, on the rod, is limited by law, can be increased on site to increase side to side stability of the crane, while maximum fore and aft stability is obtained due to the position of the axis of the rear wheels when the spacing is so increased.

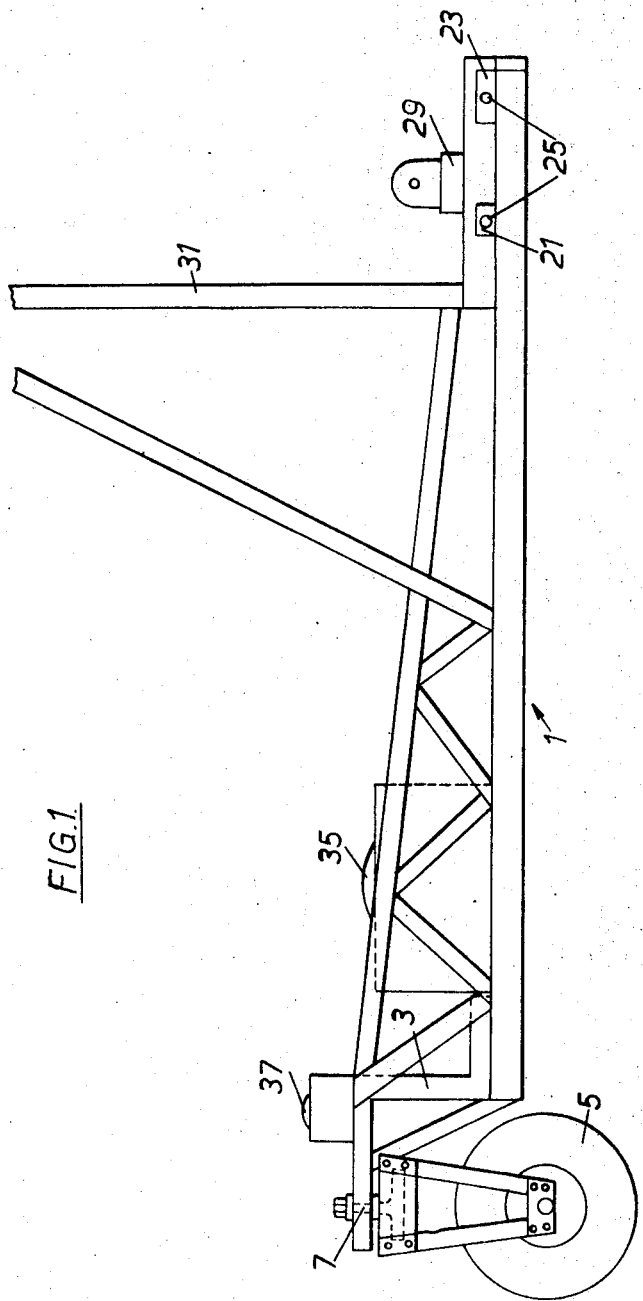

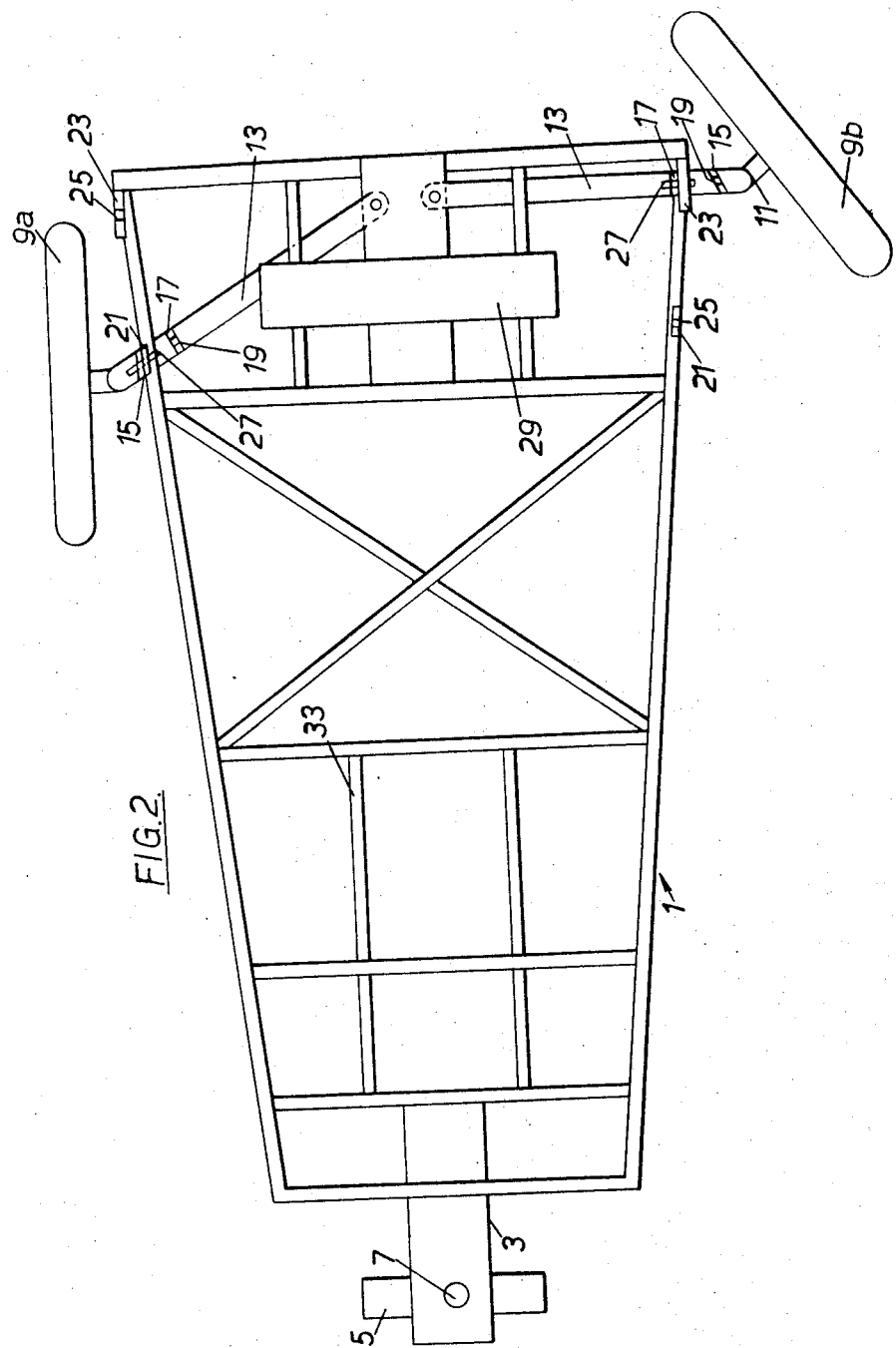

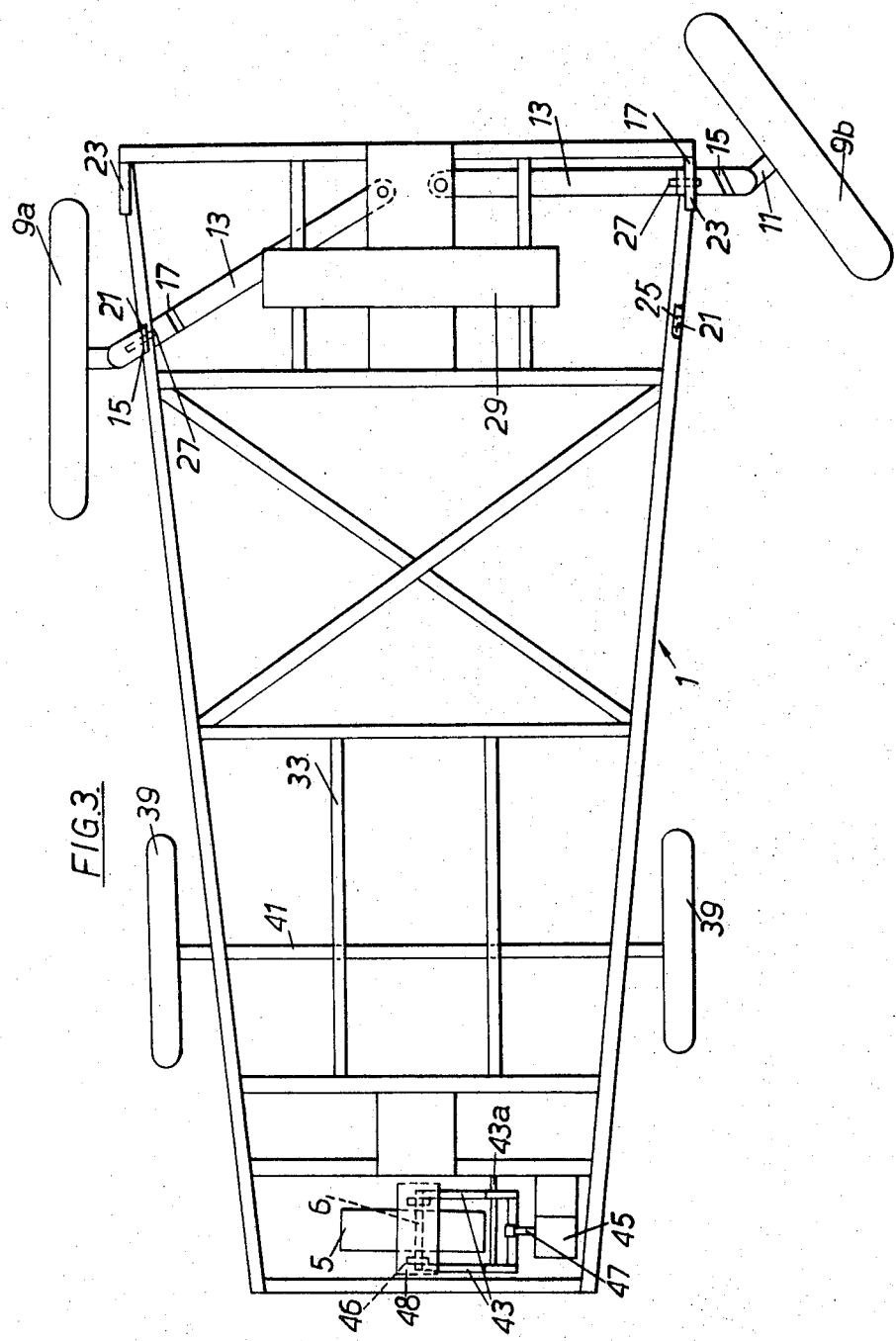

WHEEL ASSEMBLIES FOR JIB CRANES OR EXCAVATORS

This invention relates to wheel assemblies for jib cranes or excavators and the like and will be hereinafter described with reference simply to cranes.

The present invention is a wheel assembly for a crane, including a chassis having at least three wheels located thereon, a first wheel centrally mounted near to one end of the chassis, a further two wheels pivotally mounted on the chassis near to the other end thereof and pivotal between a first position in which said further two wheels are located coaxially on either side of the chassis for longitudinal travel, and a second position in which the axes of the said two wheels include an angle of 120°, and means for locking the arms in said first and second positions.

Preferably, the first wheel is rotatable about a vertical axis between a first position for longitudinal travel and a second position 90° therefrom, in which second position the plane of the first wheel together with the planes of the said further two wheels mounted in their second position, are tangential to a common circle, such that the crane can slew.

Alternatively, the chassis includes a pair of drive wheels mounted on a cross axle located on the chassis, and the first wheel is retained with its plane normal to the longitudinal axis of the chassis and is movable between a raised or first position out of contact with the ground and a lowered or second position in contact with the ground for slewing, in which lowered or second position the drive wheels are raised clear of the ground.

Embodiments of the present invention will now be described by way of example with reference to the accompanying drawings in which:

FIG. 1 is a side elevation of a chassis of a wheel assembly according to one embodiment of the invention, with the rear wheels removed and the front wheel in a first position;

FIG. 2 is a plan view of the chassis of FIG. 1 showing the front wheel and one rear wheel in the second position and the other rear wheel in the first position;

FIG. 3 is a plan view of the chassis according to a second embodiment, incorporating a modified front wheel arrangement and the rear wheel arrangement of FIG. 2;

Figure 4A:
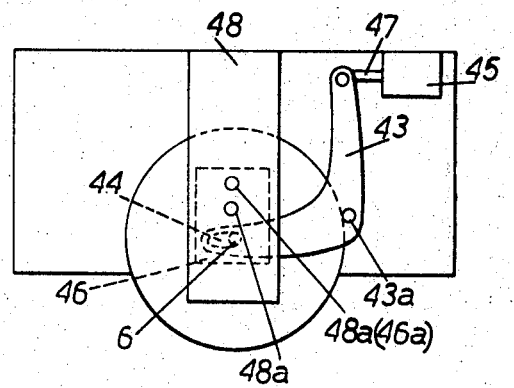
FIG. 4a is an enlarged front view of the front wheel of the second embodiment in its first position.

Referring firstly to FIGS. 1 and 2 of the drawings, a wheel assembly for a crane comprises a chassis 1 of generally triangular shape, the base of the triangle forming the rear end of the chassis 1. The chassis 1 is provided with an upwardly stepped extension 3 at its front end. A first ground-engaging wheel 5 is mounted centrally on the extension 3 about a vertical axle 7 so as to extend downwardly from the extension 3, and be rotatable thereabout through 90° in either direction from a first position in which the plane of the wheel 5 is common to the longitudinal axis of the chassis 1, to a second position in which the plane of the wheel is normal to said axis.

A pair of ground-engaging wheels 9a, 9b (FIG. 2), are located at the rear end of the chassis 1, each wheel 9a, 9b being mounted on a stub axle 11 which in turn is mounted on an arm 13. Each arm 13 is pivotally mounted on the chassis 1 and is provided with a pair of upstanding lugs 15, 17 for a purpose hereinafter described. The lug 15 is angled relative to the longitudinal axis of the arm 13 whereas the lug 17 is normal thereto and located inwardly of the lug 15. Each lug 15, 17 is provided with an aperture 19 therein. The wheels 9a, 9b are locked normally at an angle of 30° to their arms 13.

The chassis 1 is provided with a pair of upstanding lugs 21, 23 on each side. Each lug 23 extends from the rear end of the chassis 1 in a direction parallel to the longitudinal axis of the chassis 1, and each lug 21 is located forwardly thereof extending parallel to the side of the chassis 1. Each lug 21, 23 is provided with an aperture 25 therein.

The arms 13 are pivotal between two positions; in the first position as shown by wheel 9a in FIG. 2, the axles 11 are coaxial with one another and the planes of the wheels are parallel to the longitudinal axis of the chassis 1 thereby providing for longitudinal travel, when the wheel 5 is also in its first position. In the second position as shown by wheel 9b in FIG. 2, the planes of the wheels 9 are normal to axes which include an angle of 120° and the planes of the wheels 9a, 9b together with the plane of wheel 5 when in a position 90° from the first position, are tangential to a common circle such that the crane can slew.

In the first position of the wheels 9a, 9b the arms 13 are angled forwardly such that their lugs 15 are located outwardly adjacent to the lugs 21 on the chassis 1. A pin 27 is provided to pass through the then aligned apertures 19, 25 and lock the arms 13 to the chassis 1.

In the second position of the wheels 9a, 9b, the arms 13 are coaxial with one another such that their lugs 17 are located inwardly adjacent to the lugs 23 in the chassis 1. The pin 27 is passed through the then aligned apertures 19, 25 of the lugs 17, 23 respectively to lock the arms 13 to the chassis 1.

A mounting 29 is provided near the rear end of the chassis 1 for a jib 31 and a well 33 is provided near the front end of the chassis 1 for a hoist drum 35. The drum 35 is very heavy relative to the weight of the chassis 1 and is movable fore-and-aft thereof in the well 33; the drum 35 is moved to the rear of the chassis 1 to make the chassis 1 more stable when the crane is travelling light and is moved forward when the crane is loaded to counterbalance the added weight. A jib winch 37 is provided on the extension 3.

The wheel 5 is power or manually driven according to the size of the crane or the number of times the crane is likely to be moved from one location to another.

Figure 4B:
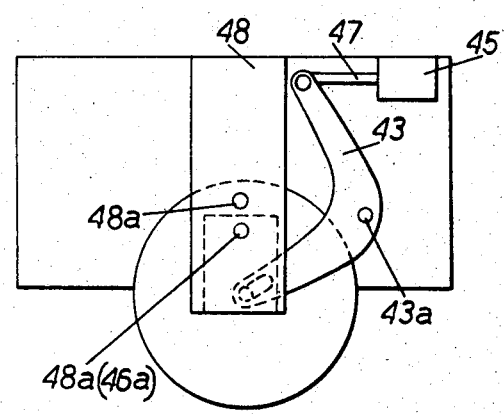
FIG. 4b is a view similar to FIG. 4a with the front wheel in its second position.

In a second embodiment, shown in FIGS. 3, 4a, and 4b, the chassis 1 is further provided with a pair of drive wheels 39 mounted on a cross axle 41. The front wheel 5 in this embodiment is mounted in a recess provided in the chassis 1 and is retained in a transverse position, i.e. with its plane normal to the longitudinal axis of the chassis 1.

The wheel 5 has its axle 6 rotatably mounted in a bracket 46 provided on each side of the wheel 5, each outer end of the axle 6 being supported in a bellcrank 43 by means of a horizontally elongated slot 44 provided therein. The bellcranks 43 are pivoted on a shaft 43a and are operatively connected to an hydraulic jacking device 45. The brackets 46 are each provided with a hole 46a for a purpose hereinafter described.

A vertical support plate 48 is mounted on the chassis 1 and has a leg projecting downwardly on each side of the wheel 5 spaced outwardly from the bellcranks 43. Each leg of the plate 48 is provided with a pair of vertically spaced holes 48a.

Horizontal reciprocation of a piston 47 of the jack 45 causes the wheel 5 to move vertically between a first position as shown in FIG. 4a in which the wheel 5 is raised clear of the ground, and a second position as shown in FIG. 4b in which the wheel 5 is jacked down into contact with the ground thus raising the chassis 1 a short distance so that drive wheels 39 are raised clear of the ground. The planes of the front wheel 5 and the rear wheels 9a, 9b are then tangential to a common circle and the crane can slew. In the first position of wheel 5, the upper holes 48a of plate 48 are horizontally aligned with the holes 46a of plates 46, and in the second position, the lower holes 48a of plate 48 are horizontally aligned with the holes 46a. The wheel 5 can be locked in either position by passing a bolt (not shown) through the aligned holes.

In a modification, the jack 45 can be adjusted to lower the wheel 5 and thus raise the drive wheels 39 off the ground by between 1—6 inches depending on the ground surface.

A forward and reverse, or left- and right-hand drive is applied to the front wheel 5 but no steering is required, although a brake is necessary.

In a further modification, either embodiment can be provided with a lighter hoist drum and a heavy roller as a suitable ballast, the roller being easily moved fore-and-aft as required.

It is preferable to have a third position for the rear wheels 9a, 9b; with the arms 13 in their second position, the axles 11 and consequently the wheels 9a, 9b can be pivoted normal to the arms 13 for short journeys with a full load on the jib.

I claim:
1. A chassis and wheel assembly for a crane including a chassis having opposed ends, at least three wheels located on said chassis, a first of said wheels being centrally mounted near to one of said ends of the chassis, a support arm pivotally mounting each of two others of said wheels, the support arms being pivotally mounted on the chassis near to the other of said ends thereof, said other two wheels and their support arms being pivotal between a first position in which said other two wheels are located coaxially on either side of the chassis for longitudinal travel, and a second position in which the spacing between said other two wheels is increased, means for locking the support arms in said first and second position, said other two wheels, when said support arms are in said second position, being disposed in vertical planes intersecting at an angle of 120°, a cross axle on the chassis, and a pair of drive wheels mounted on said cross axle, the first wheel being retained with its plane normal to the longitudinal axis of the chassis and being movable between a raised or first position out of contact with the ground and a lowered or second position in contact with the ground for slewing, in which lowered or second position the drive wheels are raised clear of the ground, and the plane of the first wheel together with the planes of the said other two wheels when disposed in their second position being tangential to a common circle, such that the crane can slew.

2. A chassis and wheel assembly as claimed in claim 1, in which the cross axle of the drive wheels is located between the first wheel and said other two wheels.

3. A chassis and wheel assembly as claimed in claim 2, in which the chassis mounts a pair of bellcranks between which the first wheel is pivotally mounted, and jack means are operatively connected to said bellcranks whereby said first wheel is movable to said raised and lower positions.

4. A chassis and wheel assembly for a crane including a chassis having opposed ends, at least three wheels located on said chassis, a first of said wheels being centrally mounted near to one of said ends of the chassis, a support arm pivotally mounting each of two others of said wheels, the support arms being pivotally mounted on the chassis near to the other of said ends thereof, said other two wheels and their support arms being pivotal between a first position in which said other two wheels are located coaxially on either side of the chassis for longitudinal travel, and a second position in which the spacing between said other two wheels is increased, means for locking the support arms in said first and second position, said support arms extending from their point of securement to the chassis forwardly and outwardly in said first position and swinging rearwardly when moving from said first position to said second position, said support arms forming with each other a larger angle in said second position than in said first position so that the outer ends of said support arms are farther from each other in said second position than in said first position.

5. A chassis and wheel assembly as claimed in claim 4, the axis of each of said other two wheels being disposed at an acute angle to its associated said support arm.